(12) United States Patent
    Morrison (10) Patent No.: US 8,744,840 B1
(45) Date of Patent: Jun. 3, 2014

(54) METHOD AND SYSTEM FOR N-DIMENTIONAL, LANGUAGE AGNOSTIC, ENTITY, MEANING, PLACE, TIME, AND WORDS MAPPING

(71) Applicant: Jason Morrison, Herndon, VA (US)

(72) Inventor: Jason Morrison, Herndon, VA (US)

(73) Assignee: Realfusion LLC, Alexandria, VA (US)

( * ) Notice: Subject to any disclaimer, the term of this patent is extended or adjusted under 35 U.S.C. 154(b) by 0 days.

(21) Appl. No.: 14/052,275

(22) Filed: Oct. 11, 2013

(51) Int. Cl.
    *G06F 17/21* (2006.01)
    *G06F 17/27* (2006.01)
    *G06F 17/20* (2006.01)

(52) U.S. Cl.
    USPC .................................... 704/10; 704/1; 704/9

(58) Field of Classification Search
    None
    See application file for complete search history.

(56) References Cited

U.S. PATENT DOCUMENTS

| | | | |
|---|---|---|---|
| 5,917,500 A | 6/1999 | Johnson et al. | |
| 6,701,318 B2 | 3/2004 | Fox et al. | |
| 6,868,421 B1 | 3/2005 | Lin | |
| 6,985,910 B2 | 1/2006 | Hollingsworth | |
| 7,117,187 B2 | 10/2006 | Agrafiotis et al. | |
| 7,237,194 B2 | 6/2007 | Grambihler et al. | |
| 7,716,167 B2 | 5/2010 | Colossi et al. | |
| 8,275,762 B2 * | 9/2012 | Gupta et al. | 707/713 |
| 8,311,998 B2 * | 11/2012 | Correll, Jr. | 707/706 |
| 8,326,812 B2 * | 12/2012 | Itoh | 707/693 |
| 2003/0217335 A1 * | 11/2003 | Chung et al. | 715/514 |
| 2006/0106783 A1 * | 5/2006 | Saffer et al. | 707/3 |
| 2008/0281814 A1 * | 11/2008 | Calistri-Yeh et al. | 707/5 |
| 2009/0024598 A1 | 1/2009 | Xie et al. | |
| 2009/0249125 A1 | 10/2009 | Bhatawdekar et al. | |
| 2010/0121883 A1 | 5/2010 | Cutting et al. | |
| 2010/0280857 A1 | 11/2010 | Liu et al. | |
| 2011/0153677 A1 | 6/2011 | Choi et al. | |
| 2011/0270829 A1 | 11/2011 | Xie et al. | |
| 2012/0023109 A1 * | 1/2012 | Sternemann et al. | 707/748 |
| 2012/0150876 A1 | 6/2012 | Yoshio et al. | |
| 2012/0290612 A1 | 11/2012 | Ritoe | |
| 2012/0290620 A1 | 11/2012 | Guan et al. | |

* cited by examiner

*Primary Examiner* — Jesse Pullias
(74) *Attorney, Agent, or Firm* — Birch, Stewart, Kolasch & Birch, LLP.

(57) ABSTRACT

A method, system, and computer-readable program for creating at least one n-dimensional map by utilizing one or more processors are disclosed. One aspect of the subject matter described can be embodied by a computer-implemented method which utilizes simple and reduced complexity algorithms in which an n-dimensional map, e.g., an EMPT (Entity, Meaning, Place, and Time) map or a language map (e.g., Words map), may be created by integrating the data itself within a special environment and context such that all pedigrees of data, in massive amounts, may be rapidly and accurately correlated and analyzed in unique and new ways.

12 Claims, 5 Drawing Sheets

METHOD AND SYSTEM FOR N-DIMENTIONAL, LANGUAGE AGNOSTIC, ENTITY, MEANING, PLACE, TIME, AND WORDS MAPPING

TECHNICAL FIELD

The technical filed relates generally to a method and system for n-dimensional mapping of data. It particularly relates to ascribing absolute mathematical values to entities and meanings of words, phrases, symbols, etc., relative to time and space.

BACKGROUND

Currently, much rigor is being spent on creation of analytical tools, each for elements within a broad spectrum of data types and use cases including but not limited to Full Motion Video (FMV), hyper-spectral, motion, audio, signals of all kinds, documents, speech, multilingual, structured and unstructured, social media, human networks, etc. Conventionally, a process is being done to conduct cross pedigree analysis, mostly by integrating the products of these tools, or of integrating the tools themselves. However, as the data types, formats, and use cases differ to such a large degree, it becomes extremely difficult to manipulate many different tools as well as conduct the analysis to identify the critical connections, trends, and indicators within and between data types that reveal important findings. Thus, it would be desirable to have a method and system for processing the large amounts of data in such an environment in a rapid and efficient manner.

SUMMARY

An object of the present invention is to provide a method and system that resolves the above-described problems by utilizing simple and reduced complexity algorithms in which an n-dimensional map, e.g., an EMPT (Entity, Meaning, Place, and Time) map or a language map (e.g., Words map), may be created by integrating the data itself within a special environment and context such that all pedigrees of data, in massive amounts, may be rapidly and accurately correlated and analyzed in unique and new ways.

According to one embodiment of the present invention, a computer-implemented method for creating at least one n-dimensional map by utilizing one or more processors is disclosed. The computer-implemented method comprising: obtaining data from a plurality of data sources, the data containing information of a plurality of items each having one or more of an entity, a meaning, a place, a time, a word, a phrase, or a symbol; ascribing meaning to position or location within an n-dimensional space represented by a fixed point for each item within a space among n-dimensional spaces, wherein a fixed point for one item is different from a fixed point for another item; arranging the fixed point for one item relative to the fixed point for another item in corresponding space according to a set of predefined variable; creating, by utilizing a mapping unit, an n-dimensional map by correlating each of the fixed points defining corresponding location within the space; translating content associated with each item into its corresponding location within the n-dimensional map and storing the translated content as a set of coordinates with corresponding relationship to each other to perpetually correspond to one or more of the entity, meaning, place, time, word, phrase, or symbol; and comparing the translated content with a new set of data to determine differences or similarities between the translated content and the new set of data to provide a fused data on one or more output device with meaningful attributes.

In other aspects of the subject matter described in this specification, the n-dimensional map is an EMPT (entity, meaning, place, and time) map created by correlating different types of data over the same entities, meanings, times, and places according to corresponding fixed points in the n-dimensional space in the form of a Cartesian or other type of coordinate representing greater than two (2) dimensions.

In other aspects of the subject matter described in this specification, the n-dimensional map is a language map created by correlating different types of data over the same words, symbols, characters, or other data representative of meaning in a plurality of languages according to corresponding fixed points in the n-dimensional space in the form of a Cartesian coordinate or other type of coordinate representing greater than two (2) dimensions.

In other aspects of the subject matter described in this specification, the computer-implemented method includes: ascribing a subordinate fixed point for each item, having a specific attribute or classification, within a subordinate space to create a plurality of subordinate n-dimensional spaces.

In other aspects of the subject matter described in this specification, the variable is selected from the group consisting of: language, classification, attribute, taxonomy, ontology, sign, symbol, phrase, and character.

Other implementations of the subject matter described in this specification may include a system for creating at least one n-dimensional map, comprising: a processing unit configured to: obtain data from a plurality of data sources, the data containing information of a plurality of items each having one or more of an entity, a meaning, a place, a time, a word, a phrase, or a symbol; ascribe meaning to position or location within an n-dimensional space represented by a fixed point for each item within a space among n-dimensional spaces, wherein a fixed point for one item is different from a fixed point for another item; and arrange the fixed point for one item relative to the fixed point for another item in corresponding space according to a set of predefined variable; and a mapping unit configured to: create an n-dimensional map by correlating each of the fixed points defining corresponding location within the space; translate content associated with each item into its corresponding location within the n-dimensional map and store the translated content as a set of coordinates with corresponding relationship to each other to perpetually correspond to one or more of the entity, meaning, place, time, word, phrase, or symbol; and compare the translated content with a new set of data to determine differences or similarities between the translated content and the new set of data to provide a fused data on one or more output device with meaningful attributes.

In other aspects of the subject matter described in this specification, the processing unit is further configured to ascribe a subordinate fixed point for each item, having a specific attribute or classification, within a subordinate space to create a plurality of subordinate n-dimensional spaces.

Other implementations of the subject matter described in this specification may include a non-transitory computer-readable storage medium having computer-executable instructions for creating at least one n-dimensional map, the computer-executable instructions, when executed by a computer having one or more processors, cause the computer to perform steps of: obtaining data from a plurality of data sources, the data containing information of a plurality of items each having one or more of an entity, a meaning, a place, a time, a word, a phrase, or a symbol; ascribing meaning to position or location within an n-dimensional space represented by a fixed point for each item within a space among n-dimensional spaces, wherein a fixed point for one item is different from a fixed point for another item; arranging the fixed point for one item relative to the fixed point for another item in corresponding space according to a set of predefined variable; creating, by utilizing a mapping unit, an n-dimensional map by correlating each of the fixed points defining corresponding location within the space; translating content associated with each item into its corresponding location within the n-dimensional map and storing the translated content as a set of coordinates with corresponding relationship to each other to perpetually correspond to one or more of the entity, meaning, place, time, word, phrase, or symbol; and comparing the translated content with a new set of data to determine differences or similarities between the translated content and the new set of data to provide a fused data on one or more output device with meaningful attributes.

In other aspects of the subject matter described in this specification, the computer-executable instructions, which, when executed by the computer, cause the computer to perform additional step of: ascribing a subordinate fixed point for each item, having a specific attribute or classification, within a subordinate space to create a plurality of subordinate n-dimensional spaces.

Further scope of applicability of the present invention will become apparent from the detailed description given hereinafter. However, it should be understood that the detailed description and specific examples, while indicating preferred embodiments of the subject matter described in this specification, are given by way of illustration only, since various changes and modifications within the spirit and scope of the subject matter described in this specification will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitative of the present invention. Like reference numbers and designations in the various drawings indicate like elements.

DETAILED DESCRIPTION

The following detailed description refers to the accompanying drawings. The same reference numbers in different drawings identify the same or similar elements. Also, in the following detailed description, for purposes of explanation, numerous specific details are set forth in order to provide a thorough understanding of the claimed subject matter. The following detailed description does not limit the concepts discussed. Instead, the scope of the concepts discussed by the appended claims and equivalents thereof.

Figure 1:
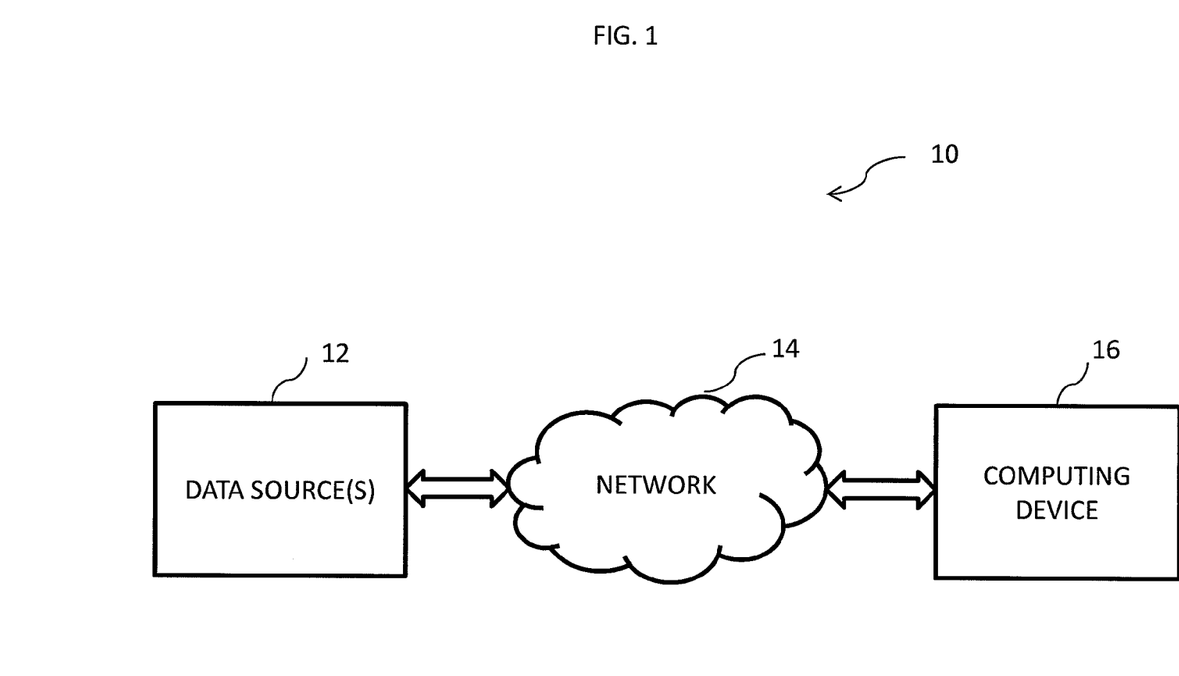
FIG. 1 is a block diagram illustrating an exemplary system for creating at least one n-dimensional map according to an embodiment.

FIG. 1 illustrates one embodiment of a system 10 implementing the n-dimensional mapping of data feature. As shown, in this embodiment a least one data source 12 is operatively connected via a network 14 to a computing device 16. According to an aspect of the present invention, the data source 12 may include a plurality of databases. The computing device 16 may be configured to receive data from one or more of the plurality of databases via the network 14. Although in this embodiment, the computing device 16 may be configured to receive data from the data source 12 via the network 14, in other embodiments, the computing device 16 may be configured to receive data without the network 14. For example, the computing device may receive data from a thumb drive as well as multiple data networks.

According to an exemplary embodiment, data source 12 may include a plurality of data sources that contain any structured or unstructured data. For example, data source 12 may include any structured or unstructured data containing an entity and/or meaning, and/or place and/or time and/or words in its data or in its metadata, e.g., text, imagery (photography full motion video, 3D imagery, moving target indication or track data), signals, sounds, communications (including 2-way communications), reports, broadcasts, public media or private media, SMS, public and private records, intelligence of any kind, or any other kind of data derived from any source, analog or digital, electronic or otherwise, e.g., sensors, collectors, data stores, streaming data, the interne or other networks.

In one embodiment, the data source 12 may include data related to entities comprised of the sum of their parts or made up of attributes and relationships resident within an n-dimensional map, created by an exemplary method of the present invention described herein, to which an object is associated. For example, a human has the following attributes: man, brown hair, the name Billy, the social security number of XXX-XX-XXXX, and the phone number of 123-456-7890. Other attribute of other entities may be very similar to this particular one, to the degree that the probability is high that these are attributes of the same actual person. Similarity can be calculated based on like attributes, differing attributes, or unknowns (such where no data exists on a particular attribute in one data set, but does exist in another), which will be described in detail later.

According to an exemplary embodiment, the data source 12 may include data related to language agnostic meanings of words, symbols, phrases, etc. The data source 12 may also include data related to the following: location below, on or above a geodetic ellipsoid in most cases and/or other scaled n-dimensional representation of space regardless of location. For example, a Geodetic ellipsoid would be used to represent actual space below and/or on, and/or above the surface of the earth and/or other like object such as a planet, moon, star or other like celestial body, but a different model could be used to map proximity and location of celestial bodies and objects in space. According to an exemplary embodiment, the data source 12 may include data related to time that may be normalized into Zulu or another time model agnostic to location and mapped to locations within n-dimensional spaces and/or within its own dimension. The data source 12 may also include data related to language, e.g., words, symbols, phrases, acronyms, sounds, gestures and any other related meaning bearing components that make up any human, machine, or other language.

Figure 2:
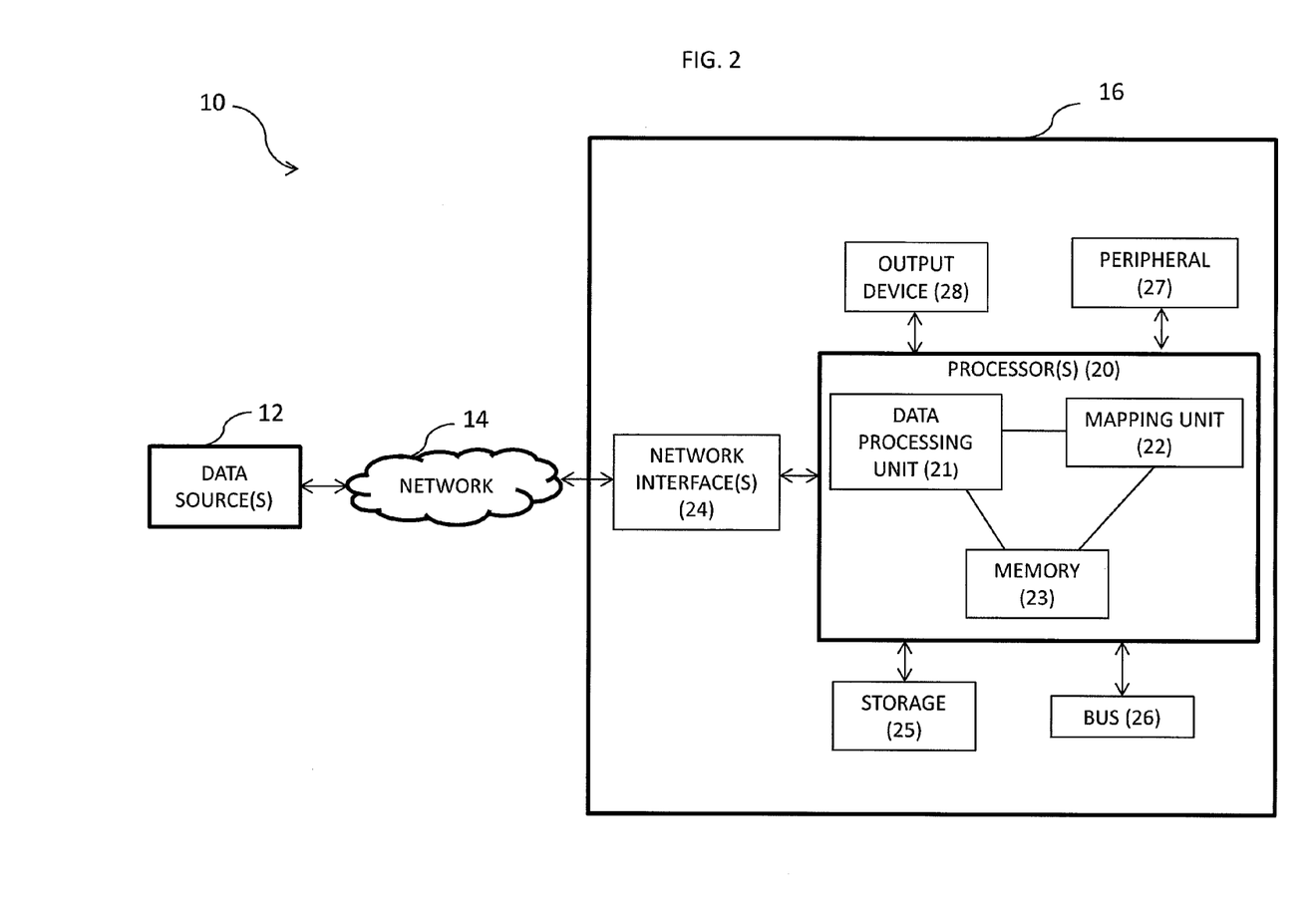
FIG. 2 is a block diagram illustrating a more detailed block diagram describing the functions performed in the computing device of FIG. 1 in accordance with an embodiment.

FIG. 2 illustrates a more detailed block diagram describing the functions performed in the computing device 16 of FIG. 1 in accordance with an exemplary embodiment. As illustrated in a very basic configuration, the computing 16 typically includes one or more processors (CPUs) 20 operatively connected with one or more network interfaces 24, one or more storage 25, one or more bus/interface controller 26, one or more peripheral 27, and one or more output device 28. According to an aspect of the present invention, each of the processor 20 may include at least one data processing unit 21, at least one mapping unit 22, and at least one memory device 23.

Depending on the desired configuration, processor 20 can be of any type including but not limited to a microprocessor (µP) circuitry, a microcontroller (µC), a digital signal processor (DSP), or any combination thereof. Processor 20 can include, although not shown, one more levels of caching, such as a level one cache and a level two cache, a processor core, and registers. The processor core (not shown) can include an arithmetic logic unit (ALU), a floating point unit (FPU), a digital signal processing core (DSP Core), or any combination thereof. A memory controller (not shown) can also be used with the processor 20, or in some implementations the memory controller can be an internal part of the processor 20.

Depending on the desired configuration, the memory device 23 can be of any type including but not limited to volatile memory (such as RAM), non-volatile memory (such as ROM, flash memory, etc.) or any combination thereof. Although not shown, memory device 23 typically includes an operating system, one or more applications, and program data. Application may include n-dimensional mapping algorithm.

Computing device 16 can have additional features or functionality, and additional interfaces to facilitate communications between the data source(s) 12 and any required devices and interfaces. For example, a bus/interface controller 26 can be used to facilitate communications between the basic configuration and one or more data storage devices 25 via a storage interface bus (not shown). The data storage devices 25 can be removable storage devices, non-removable storage devices, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and non-volatile, removable and non-removable media implemented in any method or technology for storage of information, such as computer readable instructions, data structures, program modules, or other data.

Memory 23, removable storage (not shown) and non-removable storage (not shown) are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 16. Any such computer storage media can be part of computing device 16.

Computing device 16 can also include an interface bus (not shown) for facilitating communication from various interface devices (e.g., output interfaces, peripheral interfaces, and communication interfaces) to the processor 20 via the bus/interface controller 26. Example output devices 28 may include a graphics processing unit and an audio processing unit, which can be configured to communicate to various external devices such as a display or speakers via one or more A/V ports. Example peripheral interfaces 27 include a serial interface controller or a parallel interface controller, which can be configured to communicate with external devices such as input devices (e.g., keyboard, mouse, pen, voice input device, touch input device, etc.) or other peripheral devices (e.g., printer, scanner, etc.) via one or more I/O ports. Example network interface(s) 24 may include a network controller, which can be arranged to facilitate communications with one or more other computing devices 16 over the communication network 14 via one or more communication ports. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media. Many such computer-readable media may be devised by those of ordinary skill in the art that are configured to operate in accordance with the techniques presented herein.

Computing device 16 can be implemented as a portion of a small-form factor portable (or mobile) electronic device such as a cell phone, a personal data assistant (PDA), a personal media player device, a wireless web-watch device, a personal headset device, an application specific device, a hybrid device, or distributed computing environments that include any of the above systems or devices, and the like. Computing device 16 can also be implemented as a personal computer including both laptop computer and non-laptop computer configurations.

Figure 3:
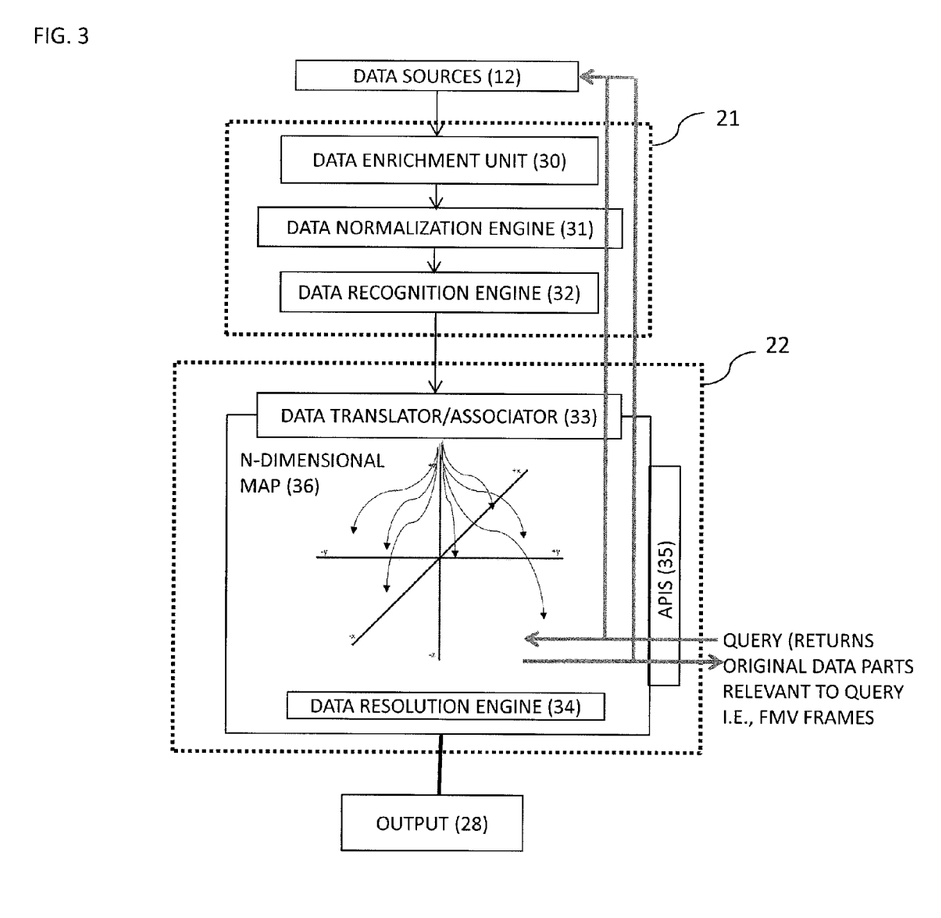
FIG. 3 is a block diagram illustrating a more detailed block diagram describing the functions performed in the processor(s) of FIG. 2 in accordance with an embodiment.

FIG. 3 is a block diagram illustrating a more detailed block diagram describing the functions performed in the processor(s) 20 of FIG. 2 in accordance with an exemplary embodiment. According to this embodiment, the data processing unit 21 may include a data enrichment unit 30, a data normalization engine 31, and a data recognition engine 32. The mapping unit 22 may include a data translator/associator 33, a data resolution engine 34, and applications programming interfaces (APIs) 35. In this example, output from the data enrichment unit 30 is input to the data normalization engine 31. Output from the data normalization engine 31 is input to the data recognition engine 32. Output from the data recognition engine 32 is input to the data translator/associator 33. Output from the data translator/associator 33 is input to the data resolution engine 34 and output from the data resolution engine is input to one or more output device 28.

According to exemplary embodiment, the data enrichment unit 30 receives data from the plurality of data source(s) 12. The data enrichment unit 30 is configured to utilize data enrichment services of private and/or commercial and/or government software or technology or capability to enrich the data. Such services may include, but not limited to gazetteers, facial recognition, and speech or voice recognition services. The data normalization engine 31 receives the raw data output by the data enrichment unit 30 normalizes the raw data and metadata. The normalized data provided by the data normalization engine 31 may then be input to the data translator/associator 33 via the data recognition engine 32. The data recognition engine 32 may also utilize private and/or commercial and/or government software or technology or capability to translate data into Entity and/or Meaning and/or Time and/or Place and/or in some cases Words and interconnecting relationships and/or attributes equal to the raw data and/or metadata in accordance with an embodiment of the present invention described herein. For example, imagery recognition software or technology or capability for full motion video (FMV) or still photography, e.g., text or speech meaning recognition software or technology or capability.

According to an exemplary embodiment, the data translator/associator 33 may operate in the following manner. As meanings are ascribed to spaces in the initial construction of the EMPT Map, those meanings in human or other language are stored for reference within the translator/associator 33 in order to identify and properly place data as it comes into the map in order to overlay that data in the appropriate location. For instance, the meaning for the word "car" in English is assigned the location x1, y1, z1, and then this relationship is saved within the translator/associator 33 so that if a data set comes in with the meaning "car" in it, it is translated to that location. If the meaning for the word "car" in Russian is also assigned to the same space, thus making the space itself agnostic to either language, but still meaning "car". This allows the system 10 to process the data in the EMPT Map language instead of in human languages. If a query is conducted in either language, the translator/associator 33 returns all finding in a language of the operators' choice, regardless of the language of the original data set.

According to this embodiment, the translator/associator 33, therefore, receives normalized data from the data normalization engine 31 via the data recognition engine 32 and translates all data into its corresponding coordinate within an n-dimensional map 36 and stores the translated data as a set of coordinates with appropriate relationship to each other to persist Entity and/or Meaning and/or Time and/or Place (and/or in some cases, Words) and associated attributes or relationships equal to the original data. For example, the n-dimensional map 36 may include an EMPT (entity, meaning, place, and time) map created by correlating different types of data over the same entities, meanings, times, and places according to corresponding fixed points in the n-dimensional space in the form of a Cartesian or other type of coordinate representing greater than two (2) dimensions coordinate described below with respect to FIG. 4. The n-dimensional map may also include a language map, e.g., Words map, created by correlating different types of data over the same words, symbols, characters, or other data representative of meaning in a plurality of languages according to corresponding fixed points in the n-dimensional space in the form of a Cartesian coordinate or other type of coordinate representing greater than two (2) dimensions described below with respect to FIG. 4. The data resolution engine 34 may resolve sequential or otherwise unresolved data, but may persist the sequential or otherwise unresolved data for reference, e.g., text or speech, into EMPT or in some cases Words, with associations to attributes and relationships of one point in space to another. For example, the text "Fred owns a black 1998 Chevy Impala." could be resolved to a the coordinate within the EMPT Map for the Meaning, or in some cases the Word, for "car" and then associated with the attributes, such as, "black" "1998" "Chevy" "Impala" with a relationship describing ownership to the Entity "Fred".

The EMPT map created by the mapping unit 22 according to an exemplary embodiment may include n-dimensional space(s) wherein entities, meanings, places, and times are mapped according to a specific point in the space in the form of a Cartesian (x, y, z) coordinate or other mathematical method of defining location within a space or dimension. In this embodiment, all n-dimensional spaces maintain all applicable mathematical fundamentals, numbers, principles, and attributes of standard n-dimensional spaces.

The Language map created by the mapping unit 22 according to an exemplary embodiment may include n-dimensional space(s) wherein, words, symbols, characters, or other data representative of meaning in human or other languages, as well as possibly places, and times are mapped according to a specific point in the space in the form of a Cartesian (x, y, z) coordinate or other mathematical method of defining location within a space or dimension.

According to an exemplary embodiment, the processor 20 is configured such that entities, meanings, places, and times are ascribed a fixed point within a space. These points, referenced as Cartesian coordinates as mentioned earlier, thereafter retain their respective meanings. Entity, meaning, place, and time-bearing coordinates are arranged relative to other coordinates in the space according to classification, taxonomy and other variables. For instance, if the meaning of the English word "Animal" is x1, y1, z1, then the meaning of the English word "Zebra" may be x1.1, y1.1, z1.1 since the English word "Zebra" means an animal which falls under that classification. The word carrying the meaning of the English word for Zebra in any other language would also assume the x1.1, y1.1, z1.1 coordinate. All languages, ontologies, taxonomies, signs, symbols, or data representative of meaning or possessing its own meaning such as the electromagnetic spectrum and colors therein, radio frequencies, sound, and time can be mapped in such a way. Places are mapped in this space using a geodetic ellipsoid 46 shown in FIG. 4. This, for all intents and purposes is a language, which instead of using letters and words to express meaning, simply assumes meaning within Cartesian coordinates.

The processor 20 is also configured to create subordinate or adjacent n-dimensional spaces referenced within n-dimensional spaces entered through a single entry coordinate. For instance, if the electromagnetic spectrum filled its own n-dimensional space and the entry point were x1, y1, z1, then any reference to color would be mapped by the mapping unit 22 to that coordinate, then to the exact color coordinate within the sub-space. The processor 20 is further configured to rotate or tumble the entire n-dimensional space in order to encrypt the meaning or coordinates of its contents and resolve the tumble by using a mathematical offset.

Figure 4:
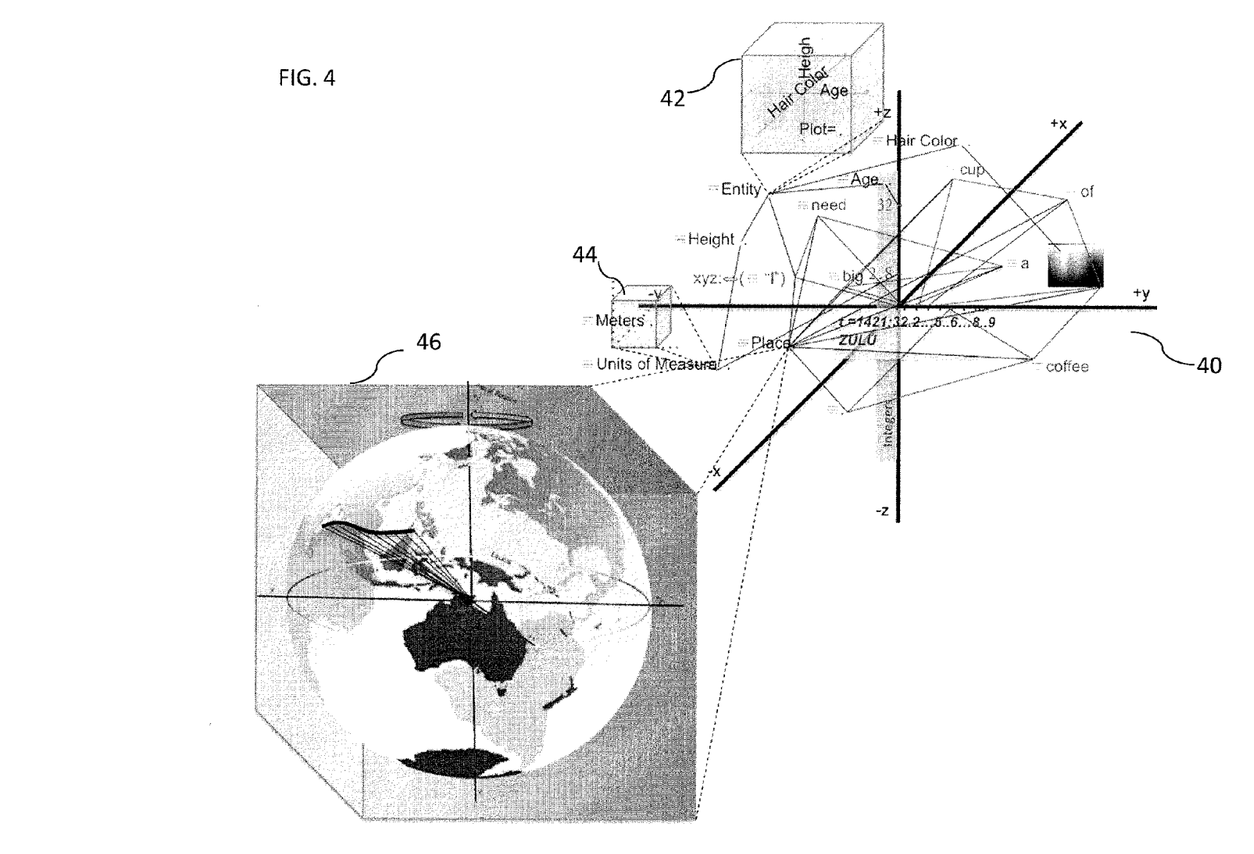
FIG. 4 is an illustration of an exemplary embodiment of a method of creating an n-dimensional map.

FIG. 4 illustrates an exemplary embodiment of a method of creating an n-dimensional map 40 by the computing device 16. Methods, weighting, types of associations, location of meanings, time, color, etc. are all rudimentarily represented herein only to demonstrate an exemplary concept and not to define its specific method or model of implementation. The phrase "I need a big cup of black coffee." is shown as if the meanings were mapped to points in the n-dimensional space.

In this example, the point in this n-dimensional space referred to as xyz has been pre-defined to be logically equivalent to the definition of the English word "I" in this context. The same is true for the other words of the sentence which is the original data may be colored in red, as well as the now normalized metadata, may be colored in blue. The red and blue words portray the meaning in the English language of the space or points in space that now hold those meanings, having been pre-defined during the construction and original mapping of the space. Beginning with the content of the original data written in red, the word "I" in English refers to an Entity, it is associated with the point in space which holds that meaning and is plotted as a particular Cartesian coordinate in this case due to this space possessing only three dimensions. In this example, the now normalized metadata contains three (3) attributes of the Entity which are in this case Hair Color, Height, and Age as shown in hypercube 42. The point in space meaning Entity is associated with the meanings for these attributes in the primary space in the following ways:

1. Hair Color: An association is made to the point in space meaning Hair Color and is herein represented by a segment connecting the two points. The Hair Color of the person according to what was the metadata is yellow in color, and therefore, an association with that color is made to the point in space representing Hair Color.

2. Height: According to the now normalized metadata, the height of this entity is 2.8 meters or it could have been in feet, but was translated into meters. Therefore, an attribute of the entity being that it has height, association is made to the point in space being predefined as such. Height, having intrinsic characteristics of measurement and being here defined in meters, as shown in hypercube 44, association is made to the point in space being predefined as such, within which exist all the various units of measure, meters being one of them. The meaning for meters, occupying a point in space within Units of Measure could be identified as such: If "Units of Measure" is X −40, Y−10, Z−45, then the point in space ascribed the meaning of meters could be X −40.6, Y−10.4, Z−45.9 because it is sub-meaning of "units of measure". In this case the Z axis values represent Integers, and therefore, the intrinsic association of quantity of Meters is required and therefore associated with X0, Y0, Z2.8.

3. Age: Age being an attribute of the entity, the two points are associated, then Age is associated with the value of 32 according to the now normalized metadata as X0, Y0, Z32.

While the attributes and relationships of the entity are represented and associated appropriately within the primary space in this case, they are also existent within the point in space predefined as the meaning of entity as separate dimensions within a hypercube.

Each attribute is a different dimension in this hypercube 42. As only 3 Dimensions can be represented, only three are used for this example. The entity is thus plotted by its attributes, not by a single attribute such as "name" or "social security number". The plot of the attributes define this entity in space and proximity to other entities from which likelihood of this person being the same person as another entity with similar attributes or likelihood of difference can be derived. This facilitates manual or automated entity resolution. Attributes will be weighted appropriately, for instance, the same social security number could have a higher weighting than the same first name.

The color black is itself represented as a Cartesian coordinate, and thus directly referenced.

The data set can be stored and referenced in many ways. This particular example begins with an initial Cartesian coordinate in this case referring to the meaning of the word "I", and the remainder of the data is stored as sequential and associative vectors. Data could be referenced in other ways as well such as distance and direction from a single known point such as the midpoint, and all vectors could issue from the midpoint as exemplified in a Place hypercube constructed similarly as described above with referenced to hypercube 42.

According to an exemplary embodiment, if data and/or metadata contain Time (t), it is plotted within a space and/or a point which contains a hypercube and data is associated to it. For example, time is normalized to Zulu or another common time model and mapped in Julian, Metric, or other time model accordingly.

If data and/or metadata contain the location of the person making the statement "I need a big cup of black coffee." it can be plotted in the Place hypercube 46 located at the point in space pre-defined as the meaning for Place. This Place hypercube 46 contains a geodetic ellipsoid with an axis through the axis of rotation of the earth and mapped to the mathematical representation of the earth's surface, subsurface, and atmosphere etc. In this particular example, the statement is made while traveling at a very high rate of speed as each word is spread along coordinates across the globe creating a long track over an elapse of only 9 seconds. Location data in any format, such as Latitude/Longitude, MGRS (Military Grid Reference System), and altitude, depth, etc., can be translated into a mathematical coordinate within the Place hypercube 46, then translated back into any location format when queried.

If data and/or metadata contain a shape in one or many dimensions it can be plotted in a Shape hypercube located at the point in space which has the meaning for "shape". The Shape hypercube can be constructed similarly as described above with referenced to hypercube 42.

According to an exemplary embodiment, as different types of data are processed outside of EMPT map or language map created by the mapping unit 22, content and metadata are translated by the data translator/associator 33 into a format, ontology, or language which may accurately represent the meaning of the data collected and possibly inform about the sensor or source of the data. These formats, ontologies, languages, etc., can be directly translated into EMPT map regardless of pedigree, to include all data available including entities, meanings, places, and times, captured therein. EMPT map or language map created by the mapping unit 22 may allow for persistence and analysis of the "DNA" of data. In this embodiment, data may be persisted by the data resolution engine 34 by mapping the meaning of the original data using coordinates in one or many spaces and their appropriate sequence and relationship thereby mapping the "DNA" of the original data set.

Further, according to an exemplary embodiment, data captured over time by the data processing unit 21 would retain its sequence as it may be constantly associated to time within EMPT map or language map created by the mapping unit 22, and would therefore form a kind of path or shape, as shown in FIG. 4, throughout the map 40 as it sequentially associated to one entity after the next. For example, data such as a document would be sequential in nature, but not associated to anything but a single time, most likely when the document was created. An image would likewise be associated only to one time and space, but its contents would be associated with their attributes such as color, type, etc., according to the capabilities of the entity recognition tool used to analyze the image.

Once this is done, the data becomes agnostic to source and type. EMPT Map translates data types and formats to its own language as described above which has the following affects and uses according to some embodiments of the present invention.

Smart Data: The data retains its own meaning which negates the need for most metadata.

Data Fusion: It allows for correlation of different types of data over the same entities, meanings, times, and places. For instance, instead of before having to use several different tools to look at several different types of data about the same person, place, thing, or time, the data fusion according to an embodiment of the present invention takes all available data and makes it immediately visible to an analyst while overlapping key indicators such as entity similarities or differences in entities, times, and places.

Symantec Search: This will also highlight non-obvious meanings in that search for meaning is not just limited to key words or associated words, but since data sets are mapped and take on shape within the EMPT map or language map created by the mapping unit 22, shape search can be done based on intersection or proximity of the data path to areas of interest or concern, subjects, patterns, and trends. For example, if signals intercept reveals that two people are talking about building an IED (improvised explosive device), and how to emplace the triggering device, this could be easily identified according to some embodiments described above even if they never say the key words such as IED and Trigger. The general shape and direction of their conversation could be tracked and even though they might use the words Peanut Butter and Jelly instead of the key words, the path of their conversation as compared to two people discussing how to assemble an IED would be very similar. According to the embodiment described with respect to FIG. 4, the processor 20 is configured to identify this and bring it to the attention of an analyst.

Query from multiple Languages: A query in English will be translated into EMPT Map or language map created by the mapping unit 22, which will then have the ability to return answers from all languages which have been translated into EMPT Map or language map created by the mapping unit 22.

Speech Pattern recognition: As each person's speech patterns are different, the mapping of spoken words over time will reveal these trends facilitating recognition of speech patterns and higher degrees of recognition of the speaker.

Master Ontology: Conflict amongst ontologies can be resolved by mapping ontologies to EMPT Map or language map as a master ontology much the same way as it may be used for rudimentary language translation and multi-lingual query.

Reduced storage requirements: The Cartesian coordinates themselves need not be stored to persist data sets, merely the exact shape of the data set and/or the angles and distance from one point to the associated point, or the angles and distances from a known point such as 0, 0, 0 from one to another as well as many other ways to identify exact location in such an environment.

The embodiments described above enable focus on advanced data fusion by creating a "smart data" framework. Processing power can then be better utilized to tackle the problems in more advanced phases of data fusion, whereas now all available power is being expended on approaching only rudimentary data fusion. As a result, analytical tools will be much simpler to build and maintain allowing new problems to be taken on.

Figure 5:
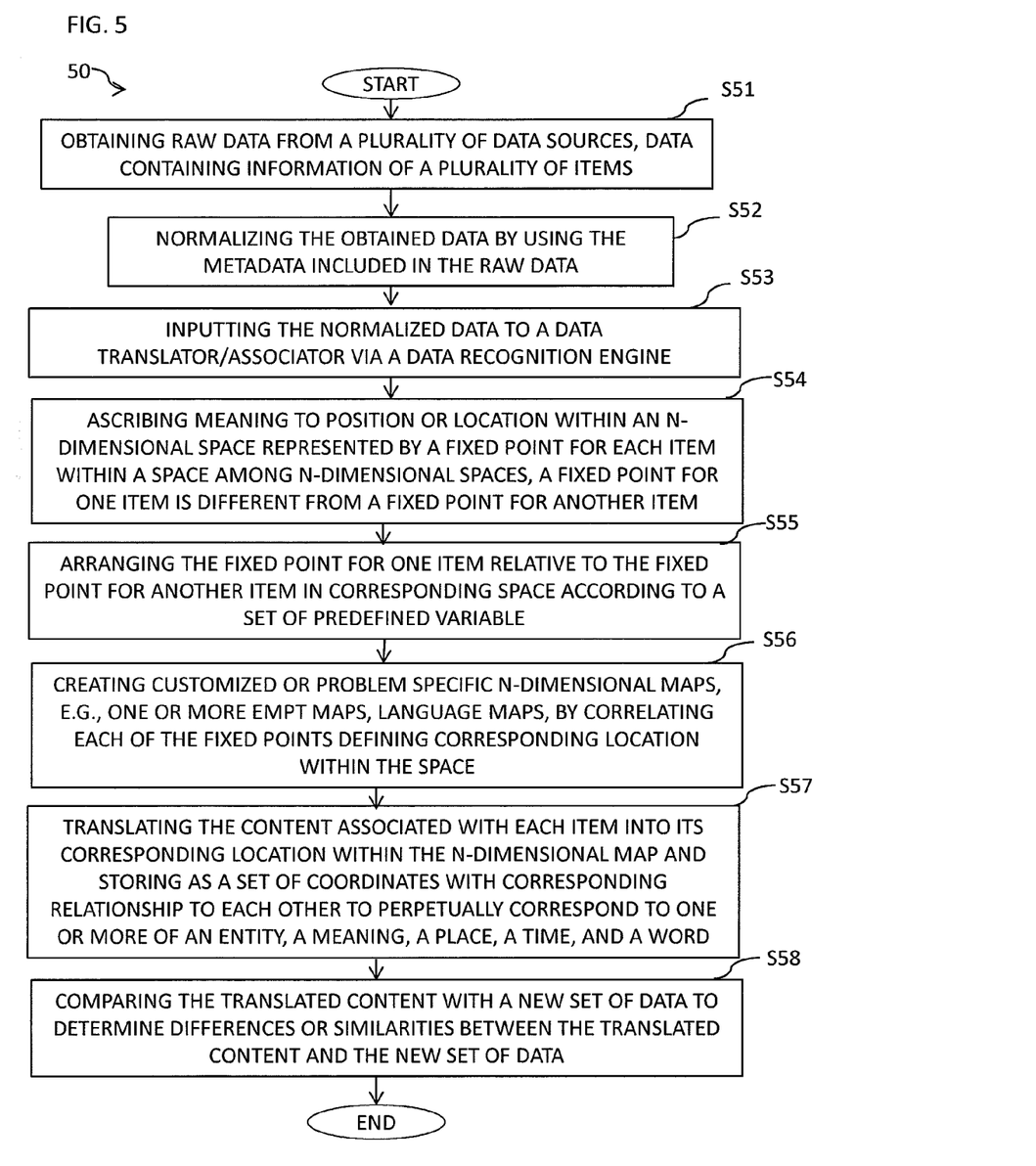
FIG. 5 is a flow diagram illustrating processes for creating at least one n-dimensional map according to an embodiment.

FIG. 5 illustrates a flow diagram for a process 50 of creating at least one n-dimensional map according to an exemplary embodiment. The process 50 may be implemented by the computing device 16.

At step S51, the data enrichment unit 21 obtains data from the plurality of data sources 12. Data can also be obtained by the data enrichment unit 21 from a thumb drive as well as multiple data networks. Data may contain information of a plurality of items each having one or more of an entity, and/or a meaning, and/or a place, and/or a time, and/or words, phrases, and symbols.

At step S52, the data normalization engine 31 receives data from the data enrichment unit 30 and uses the metadata included in the raw data to normalize the raw data.

At step S53, the normalized data provided by the data normalization engine 31 may then be input to the data translator/associator 33 via the data recognition engine 32.

At step S54, the data translator/associator 33 receives normalized data from the data normalization engine 31 via the data recognition engine 32 and ascribes meaning to position or location within an n-dimensional space represented by a fixed point for each item within a space among n-dimensional spaces. A fixed point for one item is different from a fixed point for another item. The data translator/associator 33 may also ascribe a subordinate fixed point for each item, having a specific attribute or classification, within a subordinate space to create a plurality of subordinate n-dimensional spaces.

At step S55, the fixed point for one item relative to the fixed point for another item in corresponding space is arranged according to a set of predefined variable. The set of predefined variable may include: language, classification, attribute, taxonomy, ontology, sign, symbol, phrase, and character.

At step S56, the mapping unit creates customized or problem specific n-dimensional maps, e.g., one or more EMPT maps, language maps, by correlating each of the fixed points defining corresponding location within the space. The EMPT map created by step S56 according to an exemplary embodiment may include n-dimensional space(s) where entities, meanings, places, and times are mapped according to a specific point in the space in the form of a Cartesian (x, y, z) coordinate or other mathematical method of defining location within a space or dimension. In this embodiment, all n-dimensional spaces maintain all applicable mathematical fundamentals, numbers, principles, and attributes of standard n-dimensional spaces. Similarly, the Language map created by step S56 according to an exemplary embodiment may include n-dimensional space(s) where, words, symbols, characters, or other data representative of meaning in human or other languages, as well as possibly places, and times are mapped according to a specific point in the space in the form of a Cartesian (x, y, z) coordinate or other mathematical method of defining location within a space or dimension.

At step S57, the content associated with each item is translated into its corresponding location within the n-dimensional map created in step S56 and the translated content is stored in the memory 23 as a set of coordinates with corresponding relationship to each other to perpetually correspond to one or more of the entity, meaning, place, time, and word.

At step S58, the translated content is compared with a new set of data to determine differences or similarities between the translated content and the new set of data to provide a fused data on one or more output devices 28 with meaningful attributes.

According the embodiments described above, the present invention enables entry of data into the space, allowing discovery of relationships (whether proximally, and/or through like attributes or subsets of like attributes), creating self-describing data in order to create real data fusion to: identify patterns and trends; search for other instances of patterns and trends; link findings to original data and show relevant parts of original data for analysis; and single query returns of multiple pedigrees and languages of data. Such query may include returning of original data parts relevant to query, e.g., FMV frames.

There is little distinction left between hardware and software implementations of aspects of systems; the use of hardware or software is generally (but not always, in that in certain contexts the choice between hardware and software can become significant) a design choice representing cost vs. efficiency trade-offs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the systems, devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programming interfaces (APIs) 35, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A computer-implemented method for creating at least one n-dimensional map by utilizing one or more processors, comprising:
    obtaining, by utilizing said one or more processors, data from a plurality of data sources, said data containing information of a plurality of items each having one or more of an entity, a meaning, a place, a time, a word, a phrase, or a symbol;
    ascribing, by utilizing said one or more processors, meaning to position or location within an n-dimensional space represented by a fixed point for each item within a space among n-dimensional spaces, wherein a fixed point for one item is different from a fixed point for another item;
    arranging, by utilizing said one or more processors, said fixed point for one item relative to the fixed point for another item in corresponding space according to a set of predefined variable;
    creating, by utilizing a mapping unit, an n-dimensional map by correlating each of said fixed points defining corresponding location within the space;
    translating, by utilizing said one or more processors, content associated with each item into its corresponding location within the n-dimensional map and storing said translated content as a set of coordinates with corresponding relationship to each other to perpetually correspond to one or more of said entity, meaning, place, time, word, phrase, or symbol; and
    comparing, by utilizing said one or more processors, said translated content with a new set of data to determine differences or similarities between the translated content and the new set of data to provide a fused data on one or more output device with meaningful attributes,
    wherein said n-dimensional map is an EMPT (entity, meaning, place, and time) map created by correlating different types of data over the same entities, meanings, times, and places according to corresponding fixed points in the n-dimensional space in the form of a Cartesian or other type of coordinate representing greater than two (2) dimensions coordinate.

2. The computer-implemented method according to claim 1, further comprising: creating said n-dimensional map by correlating different types of data over the same words, symbols, characters, or other data representative of meaning in a plurality of languages according to corresponding fixed points in the n-dimensional space in the form of a Cartesian coordinate or other type of coordinate representing greater than two (2) dimensions.

3. The computer-implemented method according to claim 1, further comprising:
    ascribing a subordinate fixed point for each item, having a specific attribute or classification, within a subordinate space to create a plurality of subordinate n-dimensional spaces.

4. The computer-implemented method according to claim 1, wherein said variable is selected from the group consisting of: language, classification, attribute, taxonomy, ontology, sign, symbol, phrase, and character.

5. A system for creating at least one n-dimensional map, comprising:
   a processing unit configured to:
      obtain data from a plurality of data sources, said data containing information of a plurality of items each having one or more of an entity, a meaning, a place, a time, a word, a phrase, or a symbol;
      ascribe meaning to position or location within an n-dimensional space represented by a fixed point for each item within a space among n-dimensional spaces, wherein a fixed point for one item is different from a fixed point for another item; and
      arrange said fixed point for one item relative to the fixed point for another item in corresponding space according to a set of predefined variable; and
   a mapping unit configured to:
      create an n-dimensional map by correlating each of said fixed points defining corresponding location within the space;
      translate content associated with each item into its corresponding location within the n-dimensional map and store said translated content as a set of coordinates with corresponding relationship to each other to perpetually correspond to one or more of said entity, meaning, place, time, word, phrase, or symbol; and
      compare said translated content with a new set of data to determine differences or similarities between the translated content and the new set of data to provide a fused data on one or more output device with meaningful attribute,
   wherein said n-dimensional map is an EMPT (entity, meaning, place, and time) map created by correlating different types of data over the same entities, meanings, times, and places according to corresponding fixed points in the n-dimensional space in the form of a Cartesian or other type of coordinate representing greater than two (2) dimensions coordinate.

6. The system according to claim 5, wherein said mapping unit is configured to create said n-dimensional map by correlating different types of data over the same words, symbols, characters, or other data representative of meaning in a plurality of languages according to corresponding fixed points in the n-dimensional space in the form of a Cartesian coordinate or other type of coordinate representing greater than two (2) dimensions.

7. The system according to claim 5, wherein the processing unit is further configured to ascribe a subordinate fixed point for each item, having a specific attribute or classification, within a subordinate space to create a plurality of subordinate n-dimensional spaces.

8. The system according to claim 5, wherein said variable is selected from the group consisting of: language, classification, attribute, taxonomy, ontology, sign, symbol, phrase, and character.

9. A non-transitory computer-readable storage medium having computer-executable instructions for creating at least one n-dimensional map, the computer-executable instructions, when executed by a computer having one or more processors, cause the computer to perform steps of:
   obtaining data from a plurality of data sources, said data containing information of a plurality of items each having one or more of an entity, a meaning, a place, a time, a word, a phrase, or a symbol;
   ascribing meaning to position or location within an n-dimensional space represented by a fixed point for each item within a space among n-dimensional spaces, wherein a fixed point for one item is different from a fixed point for another item;
   arranging said fixed point for one item relative to the fixed point for another item in corresponding space according to a set of predefined variable;
   creating, by utilizing a mapping unit, an n-dimensional map by correlating each of said fixed points defining corresponding location within the space;
   translating content associated with each item into its corresponding location within the n-dimensional map and storing said translated content as a set of coordinates with corresponding relationship to each other to perpetually correspond to one or more of said entity, meaning, place, time, word, phrase, or symbol; and
   comparing said translated content with a new set of data to determine differences or similarities between the translated content and the new set of data to provide a fused data on one or more output device with meaningful attributes,
   wherein said n-dimensional map is an EMPT (entity, meaning, place, and time) map created by correlating different types of data over the same entities, meanings, times, and places according to corresponding fixed points in the n-dimensional space in the form of a Cartesian or other type of coordinate representing greater than two (2) dimensions coordinate.

10. The non-transitory computer-readable storage medium of claim 9, wherein said computer-executable instructions, which, when executed by the computer, cause the computer to perform additional step of:
   creating said n-dimensional map by correlating different types of data over the same words, symbols, characters, or other data representative of meaning in a plurality of languages according to corresponding fixed points in the n-dimensional space in the form of a Cartesian coordinate or other type of coordinate representing greater than two (2) dimensions.

11. The non-transitory computer-readable storage medium of claim 9, wherein said computer-executable instructions, which, when executed by the computer, cause the computer to perform additional step of:
   ascribing a subordinate fixed point for each item, having a specific attribute or classification, within a subordinate space to create a plurality of subordinate n-dimensional spaces.

12. The non-transitory computer-readable storage medium of claim 9, wherein said variable is selected from the group consisting of: language, classification, attribute, taxonomy, ontology, sign, symbol, phrase, and character.

* * * * *